G. A. CARTER.
ROLLER BEARING.
APPLICATION FILED MAY 14, 1909.
955,848.
Patented Apr. 26, 1910.
2 SHEETS—SHEET 1.
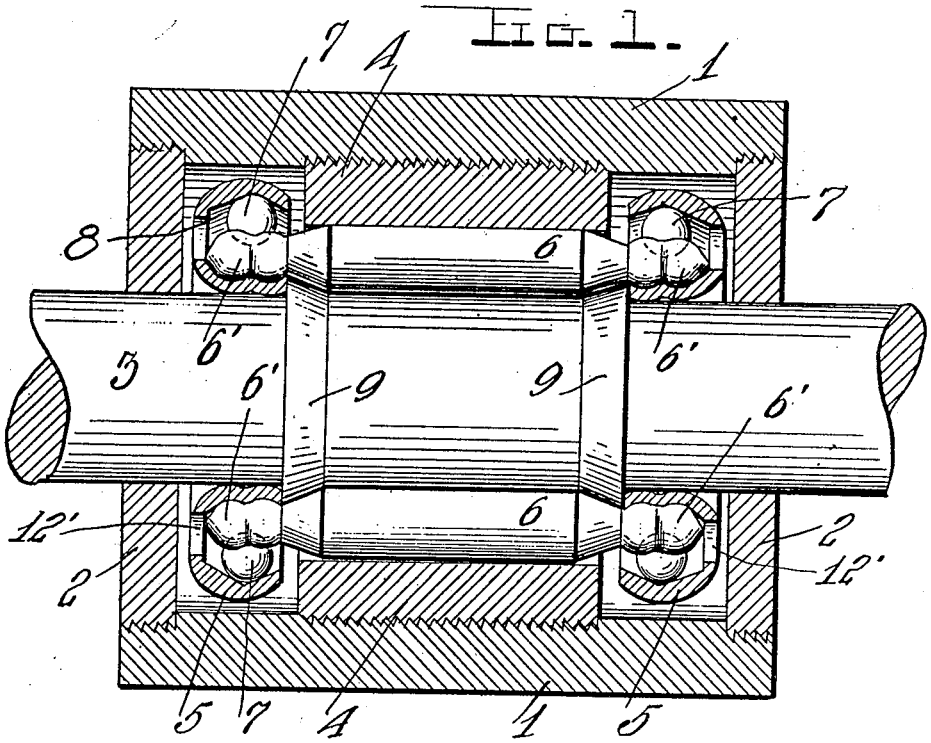
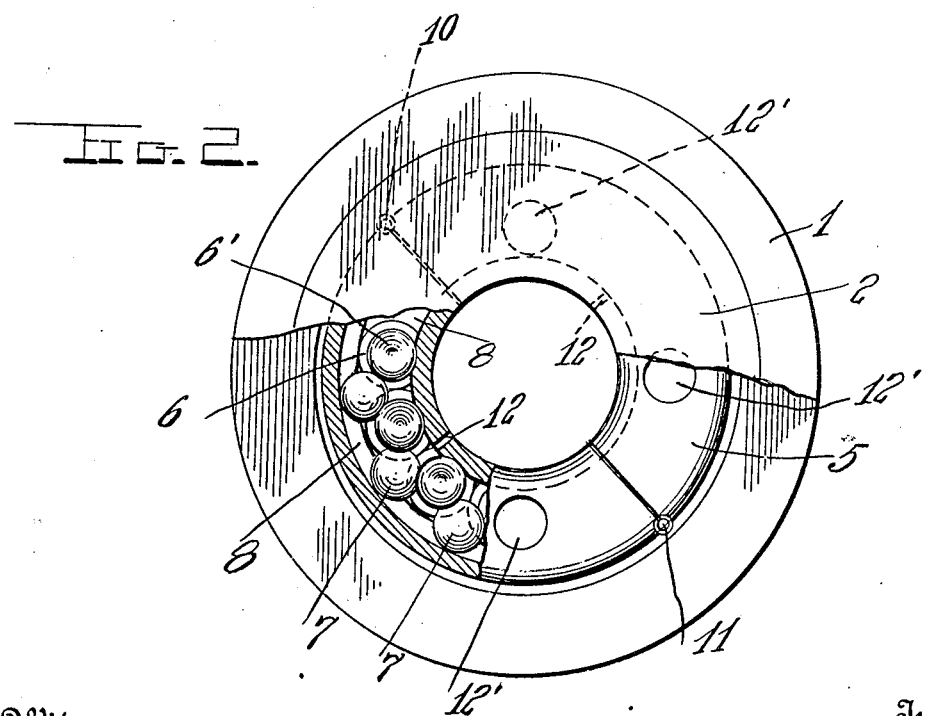
Witnesses
Morris Lessin
E. L. Chandlee
Inventor
George A. Carter
by Woodward & Chandlee
Attorneys

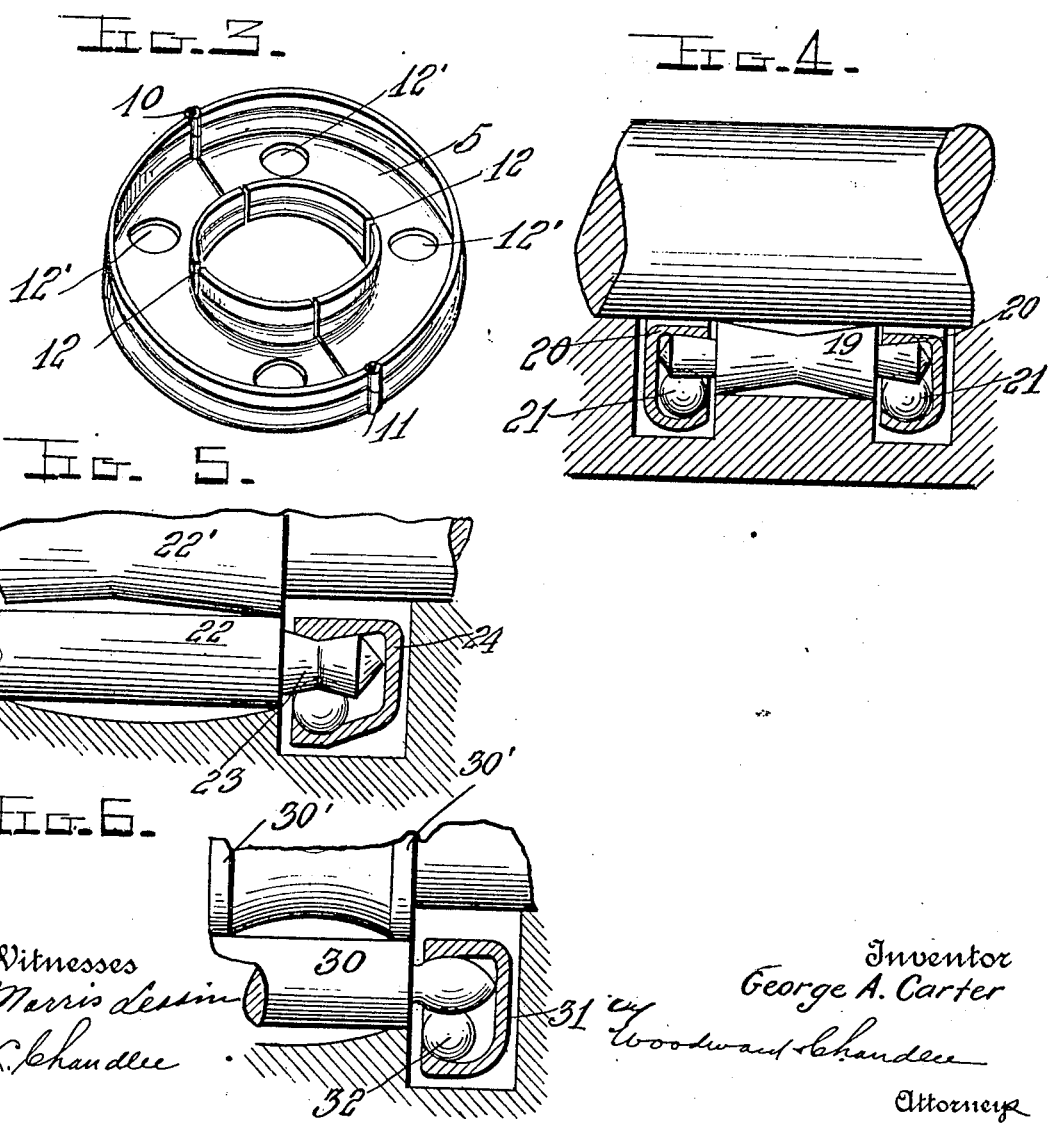

UNITED STATES PATENT OFFICE.

GEORGE A. CARTER, OF NEPHI, UTAH.

ROLLER-BEARING.

955,848.

Specification of Letters Patent. Patented Apr. 26, 1910.

Application filed May 14, 1909. Serial No. 496,054.

*To all whom it may concern:*

Be it known that I, GEORGE A. CARTER, a citizen of the United States, residing at Nephi, in the county of Juab and State of Utah, have invented certain new and useful Improvements in Roller-Bearings, of which the following is a specification.

This invention relates to roller bearings, and has for an object to provide such a device of special effectiveness, and especially constructed and arranged to prevent friction between adjacent rollers.

A primary object of this invention is to provide separating means for roller bearings, and retaining means for the separating means, all contacting parts of which mechanism move in a common direction.

Another object is to provide a novel form of retaining means therefor.

Another object is to provide a novel form of roller.

Another object is to provide such a mechanism which may be produced at a low cost.

Other objects and advantages will be apparent from the following description, and it will be understood that changes in the specific structure shown and described may be made within the scope of the claims without departing from the spirit of the invention.

In the drawings forming a portion of this specification, and in which like numerals of reference indicate similar parts in the several views, Figure 1 is a cross section of a journal equipped with the present device, partly in perspective, Fig. 2 is a segmental end view thereof. Fig. 3 is a view of the retainer, Fig. 4 is a sectional detail showing a modified form of the device, Fig. 5 is a similar view showing a still further modification, Fig. 6 illustrates a still further modified form.

Referring to the drawings, 1 indicates a suitable thimble or casing having removable ends 2. This casing is concentrically mounted upon the shaft 3, and has centrally threaded therein the ring 4, to form an inner peripheral shoulder between which and the ends 2 are located the retaining rings 5. These rings are substantially U-shaped in cross section forming channels and having their open sides in opposed relation to each other to receive the reduced ends or trunnions 6' of the rollers 6. The ends 6' are corrugated and contact with the peripheries of the balls 7 which are disposed between the ends of two adjacent rollers. The horizontal flange of the rings 5, adjacent to the shaft 3 is also corrugated to provide a bearing for the ends of the rollers. The outer flange of the rings is formed with an interior V-shaped recess 8 to provide a raceway for the balls 7. The rings are of such proportions that they are suspended between the shaft and the casing, thus reducing the friction to a minimum. To prevent any longitudinal movement of the rollers, I have provided the shaft with the collars 9, the peripheries of which are disposed at an angle thereto and have frictional engagement with the rollers 6 in advance of the reduced ends thereof. The rings 5 are preferably formed in two sections hinged as at 10 and secured together by means of a key or screw 11. The inner flange is split as at 12, in order that it may be slightly resilient, to provide for the ready insertion of the same beneath the ends of the rollers 5. The sections are also formed with a plurality of openings 12', through which the balls 7 may be inserted after the rings have been placed in position.

By providing a construction of bearing as above described the friction is practically eliminated as the rings rotate with the rollers 6 which in turn revolve the anti-friction balls 7, thus producing a bearing which will greatly facilitate the easy running of the vehicle to which it is attached. As the rings are suspended out of contact with either the shaft or the casings, it will be readily seen that the durability of the same is greatly increased. Should, however, it become necessary to replace the rings, the ends of the casing may be readily removed and new ones inserted.

Fig. 4 represents a further modification of my improved bearing wherein the rollers 19 gradually diminish in diameter toward the center thereof, thus providing two bearing surfaces upon the shaft and the casing. The ends of these rollers are likewise reduced but gradually enlarge in diameter toward their outer ends which frictionally engage the inner flange of the channel rings 20. The usual anti-friction balls 21 are also employed and rotate between the ends of the rollers upon the inner concave surface of the outer flange of the rings 20. In this form, it will be noted, still less friction is produced by reason of the small amount of bearing surface between the rollers, shaft and casing.

In Fig. 5 a still further modification is illustrated in which the rollers 22 bear at either end upon the recessed collar 22', carried by the shaft, and the similarly recessed wall of the casing. The reduced ends 23 are circumferentially recessed to provide a bearing surface for one of the flanges of the rings 24. The other flange of the rings is formed with an arc-shaped recess to provide a raceway for the anti-friction balls.

In Fig. 6 a still further modification is illustrated in which the rollers 30 contact with the peripherally concaved collar 30' at either end thereof. The channel rings 31 are supported upon the convex ends of these rollers which are separated from each other by the balls 32 which rotate in the raceways formed by the outer curved flanges of the rings.

It will be noted that in each of the forms shown the channel rings are employed, which is the principal feature of my invention, as it materially adds to the ease of operation of the same without the least additional friction. This result has long been desired in bearings of this class, and I have attained it in any one of the forms shown and described in the foregoing specification. My invention is moreover simple in construction, compactly arranged and readily put together. It will also be found highly efficient in operation, durable in use and extremely inexpensive to manufacture.

My improved bearing may be advantageously used in connection with a wheel shaft, or upon power shafts revolubly mounted in journals, as used in the construction and operation of various machinery.

Having thus described my said invention, what I claim as new and desire to secure by United States Letters Patent is:

1. A bearing of the class described comprising a casing, having removable ends, a peripheral shoulder disposed centrally within said casing, a shaft extending therethrough, rollers in frictional engagement with said shaft and said shoulder having reduced ends, and channeled rings comprising two hinged sections provided with a plurality of openings and supported upon the reduced ends of said rollers, the inner flange of said rings being split.

2. A bearing of the class described comprising a casing, having removable ends, a peripheral shoulder disposed centrally within said casing, a shaft extending therethrough, rollers in frictional engagement with said shaft and said shoulder having reduced ends, outwardly flared peripheral plates secured on said shaft for preventing the longitudinal movement of said rollers, and channeled rings comprising two hinged sections each provided with a plurality of openings and supported upon the reduced ends of said rollers, the inner flange of said rings being split.

In testimony whereof I affix my signature, in presence of two witnesses.

GEORGE A. CARTER.

Witnesses.
 WM. A. C. BRYAN,
 THOMAS B. WISKERS.